United States Patent [19]
Tokumaru et al.

[11] Patent Number: 6,105,206
[45] Date of Patent: Aug. 22, 2000

[54] PORTABLE ELECTRICALLY POWERED BLOWER APPARATUS

[75] Inventors: Phillip T. Tokumaru, Monrovia; Bart D. Hibbs, Altadena; Scott C. Newbern, Simi Valley; Thomas Zambrano, Long Beach, all of Calif.

[73] Assignee: Department of Water and Power City of Los Angeles, Los Angeles, Calif.

[21] Appl. No.: 09/291,504

[22] Filed: Apr. 13, 1999

[51] Int. Cl.[7] .......................................................... A47L 5/24
[52] U.S. Cl. ................................. 15/344; 15/405; 15/410
[58] Field of Search .................................. 15/327.5, 344, 15/405, 410; 417/234

[56] References Cited

U.S. PATENT DOCUMENTS

| | | | |
|---|---|---|---|
| 2,586,145 | 5/1952 | Breuer et al. | 15/327.5 |
| 2,969,559 | 1/1961 | Landis | 15/344 |
| 2,972,160 | 2/1961 | Hahn | 15/344 |
| 3,937,590 | 2/1976 | Mani | 415/119 |
| 4,132,507 | 1/1979 | Akiyama et al. | 417/234 |
| 4,237,576 | 12/1980 | Stakes | 15/344 |
| 4,461,055 | 7/1984 | Zerrer et al. | 15/344 |
| 4,692,091 | 9/1987 | Ritenour | 415/119 |
| 4,734,017 | 3/1988 | Levin | 15/344 |
| 4,748,712 | 6/1988 | DiGiovanni | 15/327.5 |
| 4,884,314 | 12/1989 | Miner et al. | 15/344 |
| 4,945,604 | 8/1990 | Miner et al. | 15/344 |
| 5,074,006 | 12/1991 | Eremita | 15/344 |
| 5,090,088 | 2/1992 | Toth | 15/405 |
| 5,251,281 | 10/1993 | Fravel, Jr. | 392/384 |
| 5,511,281 | 4/1996 | Webster | 15/344 |
| 5,727,283 | 3/1998 | Webster | 15/344 |

*Primary Examiner*—Theresa T. Snider
*Attorney, Agent, or Firm*—Thomas I. Rozsa; Tony D. Chen; Jerry Fong

[57] ABSTRACT

An improved portable electrically powered leaf blower is disclosed that can provide levels of air flow and velocity comparable to those of gasoline-powered blowers, yet that generates substantially reduced noise, eliminates exhaust emissions and emissions from spilled fuel, and is lightweight and convenient to operate. The leaf blower incorporates a sound-insulated duct that encloses an electric motor and fan assembly, and a handle projects above the duct's inlet end. Electrical power is provided by a battery pack carried in a backpack worn by the operator. Positioning the primary noise sources within a duct that in use is positioned close to the ground minimizes noise levels both at the operator's ears and at a distance.

65 Claims, 5 Drawing Sheets

PORTABLE ELECTRICALLY POWERED BLOWER APPARATUS

BACKGROUND OF THE INVENTION

This invention relates generally to portable blowers of the kind that can be carried by an operator and used to clear leaves and other debris and, more particularly, to blowers of this kind that are electrically powered.

Portable leaf blowers of this general kind are well known. Most such blowers are powered by small internal combustion engines carried on the operator's back. A duct extends from the backpack, with a handle allowing the operator to manipulate the duct to direct the flow of air. Although gasoline-powered leaf blowers of this kind function generally satisfactorily, they are considered to generate excessive noise and air pollution. This excessive noise has led some municipalities even to enact ordinances making the use of such gasoline-powered blowers illegal under certain conditions.

Efforts have been made in the past to develop electrically powered blowers to compete with gasoline-powered blowers. Such efforts have not proven to be entirely successful. Electrically powered blowers that have achieved the desired low noise levels have provided inadequate air flow and velocity. On the other hand, electrically powered blowers that have provided adequate air flow and velocity have been unduly noisy and/or bulky and cumbersome to use.

There remains a need for an electrically powered portable blower that can provide levels of air flow and velocity comparable to those of gasoline-powered blowers, yet that generates substantially reduced noise and that is lightweight and convenient to operate. The present invention fulfills this need and provides further related advantages.

SUMMARY OF THE INVENTION

The present invention is embodied in a portable electrically powered blower apparatus configured for use in moving leaves and other debris, which can provide levels of air flow and velocity comparable to those of gasoline-powered blowers, yet that generates substantially reduced noise and that is lightweight and convenient to operate. The apparatus incorporates an electric motor and associated fan located within a duct and configured to direct air along a flow path through the duct, from an inlet to an outlet. A handle projects above the duct's inlet and is configured to be gripped by an operator, such that during operation of the blower apparatus the duct, motor, and fan are located below the level of the operator's hand, in proximity to the ground. This configuration substantially reduces noise emissions, and it eliminates exhaust emissions and emissions from spilled fuel.

In a more detailed feature of the invention, the blower apparatus further incorporates a portable battery pack for supplying electrical power to the motor. The battery pack can be carried within a backpack configured to be worn on the operator's back. In addition, a variable speed control device can be operatively coupled to the motor, to enable the operator to controllably vary the motor's speed.

In other more detailed features of the invention, the blower apparatus further includes an elongated support tube that extends coaxially through at least a portion of the duct and carries the motor and the fan. In one embodiment, the motor is carried such that a surface is exposed directly to cooling air being directed through the duct. An electronic controller associated with the motor likewise can be carried by the support tube, adjacent to the motor, such that a surface likewise is exposed directly to cooling air being directed through the duct. One or more heat sinks can be mounted in heat-exchange contact with the motor and/or the electronic controller, and positioned for direct exposure to cooling air being directed through the duct.

In another embodiment, the support tube is closed at its downstream end and open at its upstream end, and one or more vents are formed in the tube adjacent to the motor. During operation of the blower apparatus, cooling air is drawn through the support tube, from its open end to the one or more vents. In yet another embodiment, the opposite ends of the support tube both are open, and cooling air is drawn through the tube from the downstream end to the upstream end. An optional cooling fan can be included, to assist in directing cooling air through the support tube.

In other more detailed features of the invention, the duct has a substantially circular cross-section, and the blower apparatus can further include a plurality of preswirl vanes radially mounted upstream of the motor and a plurality of stator vanes radially mounted downstream of the motor. To dampen noise, these preswirl vanes and stator vanes can be constructed of acoustic damping material, and acoustic damping material can be mounted on the interior surface of the duct. Additional noise dampening can be provided by configuring the fan with a hub and a plurality of fan blades spaced nonuniformly around the periphery of the hub. The preswirl vanes and the stator vanes also can be spaced nonuniformly with respect to each other.

One or more duct extensions and/or a nozzle can be selectively attached to the outlet of the duct, depending on the particular use to which the blower apparatus is being applied. The blower apparatus can further incorporate a forearm support attached to the handle.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
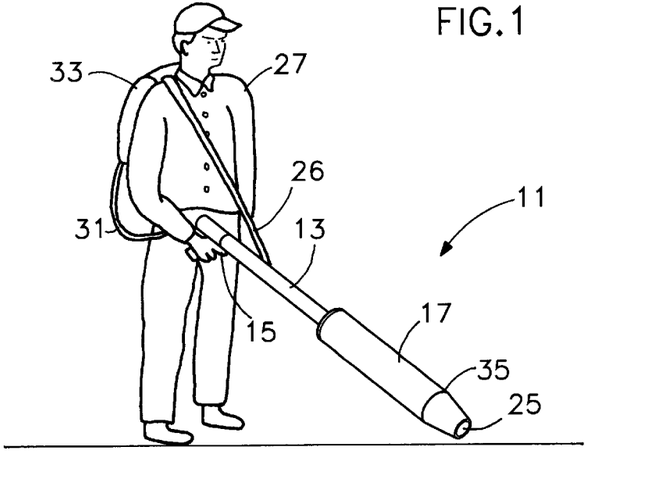
FIG. 1 is a perspective view of an electrically powered leaf blower in accordance with the invention, in use by an operator to blow debris.
Figure 2:
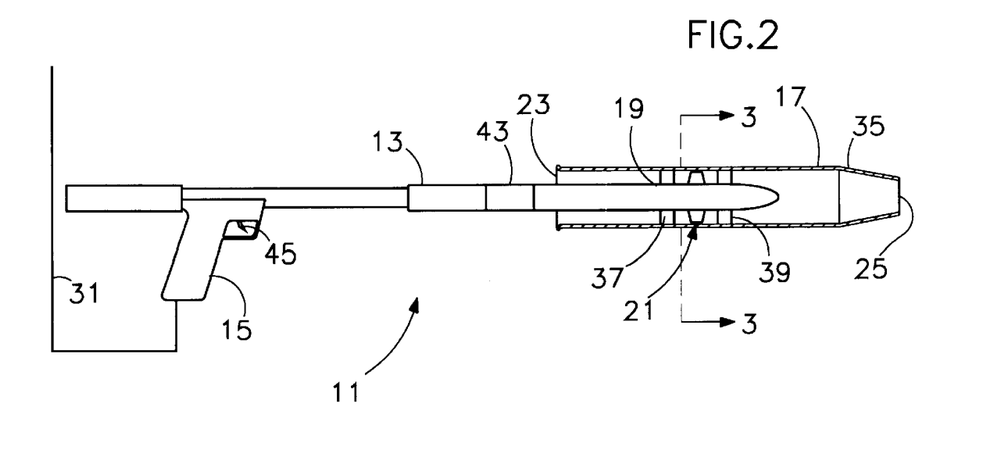
FIG. 2 is a side, partial sectional view of the leaf blower of FIG. 1, showing the blower's electric motor and fan assembly mounted on a support tube extending coaxially through a duct.

With reference now to the illustrative drawings, and particularly to FIGS. 1 and 2, there is shown an electrically powered hand-held blower 11 configured for use in moving leaves and other debris. The blower incorporates an elongated support tube 13, which carries a handle 15 in the form of a pistol grip attached along its length and which concentrically mounts an air duct 17 at its lower end. An electric motor 19 and a fan (or compressor) assembly 21 are supported by the support tube within the duct, for directing air through the duct, from a duct inlet 23 to a duct outlet 25. A shoulder strap 26 supports the blower's weight on the shoulder of an operator 27. The blower is sufficiently lightweight to be conveniently manipulated by the operator using just the handle. Electrical power for the blower is provided via a cable 31 connected to a portable battery pack carried within a backpack 33 worn on the operator's back.

During normal operation of the blower 11, the duct 17 is positioned immediately above the ground, as shown in FIG. 1. This automatically positions the blower's noise sources, i.e., the duct's inlet 23 and outlet 25, the electric motor 19, and the fan assembly 21, close to the ground. This minimizes noise at the operator's ear level. Further noise minimization is achieved because the motor and fan assembly are positioned within the duct, which functions as a noise baffle or muffler.

The duct 17 preferably is straight, with a length of about two feet, and it preferably has a circular cross-section, with a diameter of about six inches. The circular cross-section minimizes the duct's circumference for a given flow area, which reduces friction losses and thus increases air flow rate for a given motor power output. Increasing the length of the duct can increase the blower's required power and weight, but it can increase noise dampening and thereby reduce noise output during operation. The duct tapers slightly at its outlet, as indicated by the reference numeral 35, to increase the air flow's velocity. The duct is constructed of any suitable material, e.g., a moldable plastic material, that is relatively lightweight and rigid, yet durable. The duct's inlet 23 is flared, to prevent the air from separating from the duct's wall.

The support tube 13 preferably is hollow, with openings at one or both of its ends. The tube preferably has a length of about three feet, with about one foot of length lying within the duct 17 and about two feet of length projecting upwardly from the duct's upper end. A set of radial, preswirl support vanes 37 mount an upper portion of the support tube concentrically within the duct, and a set of stator vanes 39 mount a lower portion of the support tube concentrically within the duct. A bearing 38 ensures that the support tube's upper and lower portions remain properly aligned. The tube has a generally circular cross-section, and the motor 19 and the fan assembly 21 are mounted concentrically within it. The tube is constructed of any suitable material, e.g., polyvinyl chloride, that is lightweight and rigid, yet durable.

In an alternative embodiment (not depicted in the drawings), a portion of the support tube is arranged not to be coaxial with the duct. Instead, that portion of the support tube extends laterally through the duct.

The electric motor 19 is a high-efficiency, brushed or brushless direct current (dc) motor, which is supported by the support tube 13 at a position about in the middle of the duct 17. Depending on the characteristics of the fan assembly 21, the motor preferably operates at a speed in the range of about 10,000 to 25,000 rpm. One suitable motor is the Aveox 1415/4Y brushless dc motor.

The fan assembly 21 has an axial flow configuration, and it is driven by the motor 19 in a direct drive manner, with no intervening gear reduction. The fan assembly operates at a high speed in the range of about 10,000 to 25,000 rpm. One suitable fan assembly is available from Kress Jets. The fan assembly preferably is configured with a hub 40 and fourteen nonuniformly spaced blades 41 (FIG. 3), although, as discussed below, the number, configuration and shape of the blades can be modified to reduce noise during operation. The peak air speed achieved by the preferred motor, fan assembly, and duct 17 is about 180 miles per hour, with a peak air flow rate of about 380 cubic feet per minute and a peak pressure of about 0.5 pounds per square inch.

Figure 3:
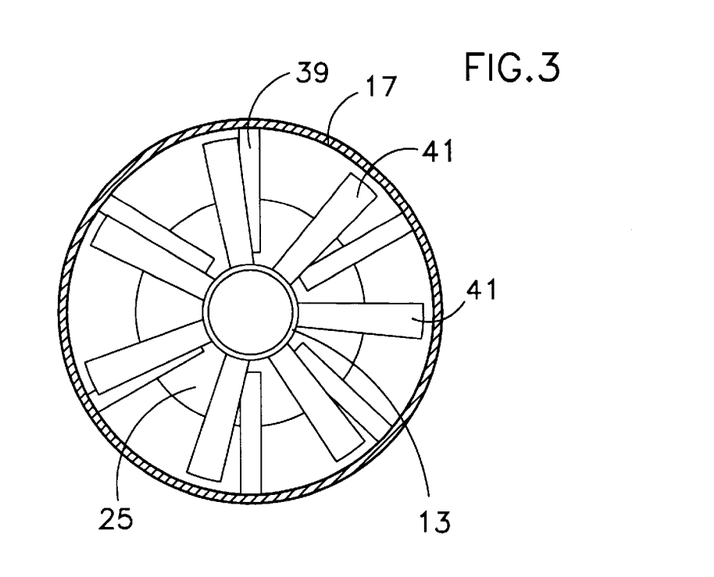
FIG. 3 is a cross-sectional view of the leaf blower of FIG. 1, taken in the direction of the arrows 3—3 in FIG. 2, showing the blades of the fan assembly and showing preswirl and stator vanes.

The set of preswirl support vanes 37 and the set of stator vanes 39 both preferably are configured to impart a circumferential velocity to the air that is opposite to that imparted by the fan blades 41. This minimizes swirl in the air being discharged from the duct outlet 25, which optimizes the blower's efficiency.

In an alternative embodiment (not depicted in the drawings), the fan assembly incorporates multiple stages of blades, with the blades at each stage being pitched for maximum efficiency. A separate set of stator vanes can be disposed between successive stages of fan blades. Alternatively, each stage of fan blades can be driven by a separate motor, and the stages can be counter-rotating.

The blower 11 further incorporates an electronic motor controller 43 for operating the motor 19 at variable speeds. This feature enables the operator 27 to conveniently collect leaves and other debris into individual piles, for later collection, with the added benefit of better power utilization. One suitable controller is the Aveox H160 controller, sold by Aveox, Inc., of Westlake Village, Calif. For convenience and simplification, the controller is modified to be controlled using a simple potentiometer. A variable-speed switch 45 is provided, to allow the operator 27 to controllably vary the speed of the motor for the requirements of a given task. This switch preferably takes the form of a trigger mounted adjacent to the pistol-grip handle 15, which the operator can conveniently pull or release, to control the air flow rate. A potentiometer (not shown) is associated with the switch and it is connected to provide a variable-voltage input signal to the motor controller, which adjusts the speed of the motor, accordingly.

The variable-speed switch 45 preferably is spring-loaded so that it returns to a no-flow position when released, although it alternatively could be made to remain in place when released. Alternatively, the switch could be a simple ON/OFF switch, and a separate rotary manual speed control knob could be provided, as well. A turbo button also could be provided, to allow the operator effect to a high-speed "burst" mode, for short, high-power operation.

Electrical power for the blower 11 is provided either by an ac power cord (not shown) or by a rechargeable battery pack carried in the backpack 33 (FIG. 1). In the latter case, a voltage of 24 to 48 volts is preferred. This provides a safe operating voltage for the user and also reduces losses in the motor controller 43 and in the connecting cables. The size and weight of the battery pack will vary according to the motor 19 being used and according to the particular operating time required. The battery voltage preferably is slightly higher than the desired motor voltage, to prevent voltage droop as the battery discharges.

Preferred battery configurations include lead-acid, nickel-cadmium, and nickel-metal-hydride battery packs. Lead-acid battery packs weigh in the range of about 18 to 27 pounds. Estimated operation times for the blower 11, at half power and full power, for such lead-acid battery packs are shown in Table 1 below. The battery pack can be situated in a backpack (FIG. 1) or on a shoulder sling (not shown). Alternately, the battery pack could be carried within a separate case.

TABLE 1

Estimated Lead-Acid Battery Pack Operating Duration

| Weight | Half Power | Full Power |
|---|---|---|
| 18 lb. | 25 min. | 10 min. |
| 24 lb. | 35 min. | 15 min. |
| 27 lb. | 45 min. | 20 min. |

The set of radial, preswirl support vanes 37 and the set of stator vanes 39 that secure the duct 17 in its concentric position relative to the support tube 13 are configured to direct air flow along the duct. To reduce noise, the number of radial supports, stator vanes, and fan blades should not have a common factor greater than one. For example, five preswirl support vanes, nine stator vanes, and seven fan blades can be used, as depicted in FIG. 3. This reduces the generation of noise as the fan blades rotate relative to the stator vanes.

The blower 11 can incorporate various additional features to reduce the generation of noise during its operation. For example, the interior wall of the duct 17 can be lined with acoustic foam, and the preswirl vanes 37 and the stator vanes 39 similarly can be constructed of, or coated with, acoustic materials. One suitable material to use for acoustic damping is DYNALINER acoustic foam, produced by Dynamat, Inc. In addition, the blades of the fan assembly can be spaced nonuniformly around the hub, to reduce the emission of blade noise. The upstream preswirl support vanes attaching the duct to the support tube 13 are streamlined, and they are positioned out of alignment with the leading edges of the fan blades. A blower incorporating the features described above, operating at full power, has been measured to produce noise at 64 decibels, measured at a distance of 50 feet.

Figure 4:
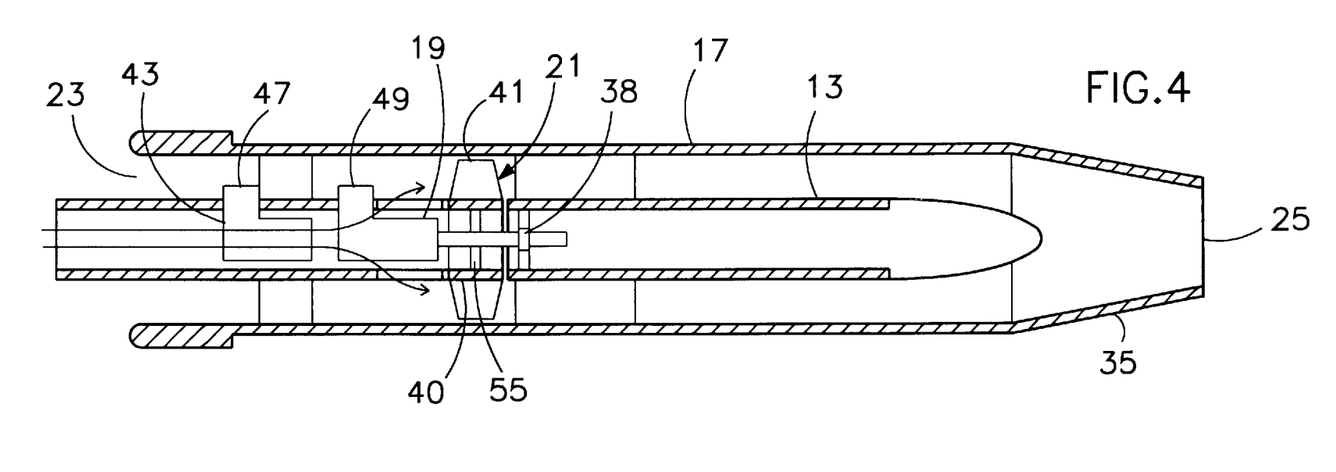
FIG. 4 is a detailed side cross-sectional view of the duct, motor and fan assembly of the leaf blower of FIG. 1, and further showing the motor controller and heat sinks mounted on the support tube.

Heat generated during operation of the motor 19 and the motor controller 43 can be removed in several ways. The optimal way depends on the nature of the motor. One way, implemented by an embodiment of the invention depicted in FIG. 4, is to mount the motor and the controller with at least a portion of their external surfaces exposed to the air being directed through the duct 17. This cools the motor and motor controller by forced convection. To minimize blocking of the air flow path, a first heat sink 47 in heat-exchange contact with the motor and a second heat sink 49 in heat-exchange contact with the motor controller are positioned in the air flow path. The heat sinks preferably are constructed of a material having relatively high thermal conductivity. In addition, the heat sinks can also function as the upstream support and preswirl vanes.

Figure 5:
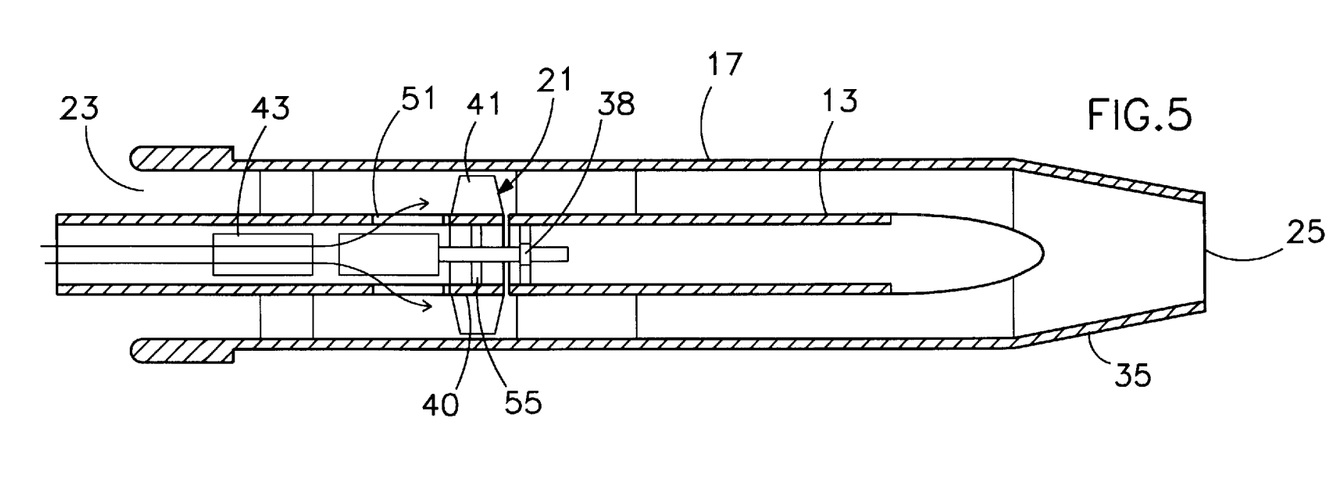
FIG. 5 is a detailed side cross-sectional view of the duct, motor and fan of a second embodiment of a leaf blower in accordance with the invention, wherein the support tube of this embodiment incorporates vents adjacent to the motor, for directing cooling air past the motor and motor controller.

Other ways to cool the motor 19 and the motor controller 43 utilize one or more vents formed in the support tube 13. In an embodiment of the invention depicted in FIG. 5, the support tube's upstream end is open and its downstream end in closed. A plurality of vents 51 are formed in the support tube, adjacent to the motor, whereby operation of the blower 11 draws air through the tube because of a reduced pressure within the duct 17, upstream of the fan assembly 21. The vents preferably have a total cross-sectional area of about 3 to 4 in$^2$, to provide for sufficient air flow to cool the motor and motor controller.

Figure 6:
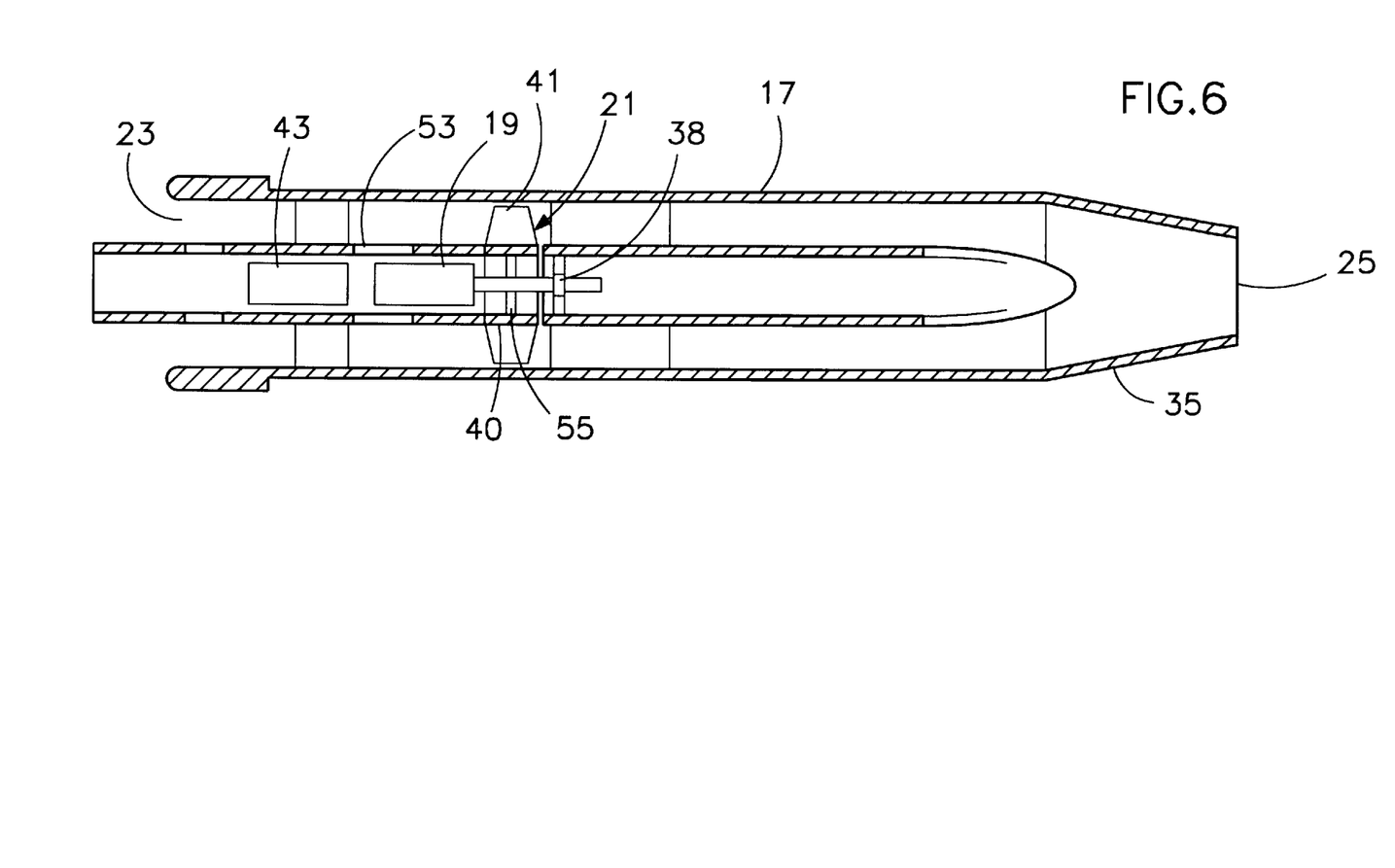
FIG. 6 is a detailed side cross-sectional view of the duct, motor and fan of a third embodiment of a leaf blower in accordance with the invention, wherein the support tube of this embodiment is open at both of its ends and a cooling fan is incorporated for directing cooling air past the motor and motor controller.

In an alternative embodiment of the invention, depicted in FIG. 6, the support tube 13 is configured to be open at both its upstream end and its downstream end. In addition, a plurality of vents 53 are formed in the portion of the support tube adjacent to the motor 19. During operation of the blower, air is drawn up the tube, from the relatively high pressure at the tube's downstream end toward the relatively low pressure at the tube's vents and at the tube's upstream end.

An optional cooling fan 55 can be provided, to assist in drawing air through the support tube. This cooling fan can be longitudinally aligned with the main fan assembly 21. In an alternative embodiment (not shown in the drawings), the cooling fan can be configured to direct cooling air in the opposite direction, from the support tube's upstream end toward its downstream end.

Figure 7:
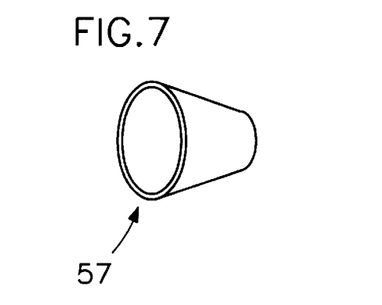
FIG. 7 is a perspective view of a nozzle that can be selectively attached to the outlet of the duct of the leaf blower of FIG. 1.
Figure 8:
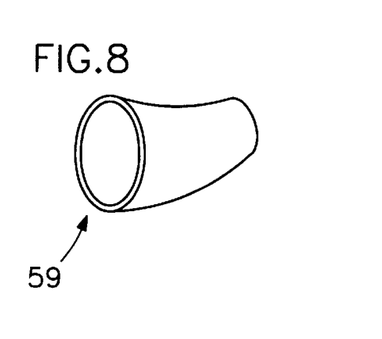
FIG. 8 is a perspective view of a duct extension that can be selectively secured to the outlet of the duct of the leaf blower of FIG. 1.

FIG. 7 depicts a nozzle 57 that is configured to be selectively attached to the outlet end of the duct 17. This enables the blower to be used for specific service requirements, such as edge cleaning. The nozzle can be secured to the duct's outlet by elastic bands, latches, or other appropriate fittings. Similarly, FIG. 8 depicts a duct extension 59 that is configured to be selectively attached to the duct's outlet, to temporarily increase the duct's length when desirable. The duct extension is slightly curved, such that the discharged air can more conveniently be directed along a generally horizontal path.

Figure 9:
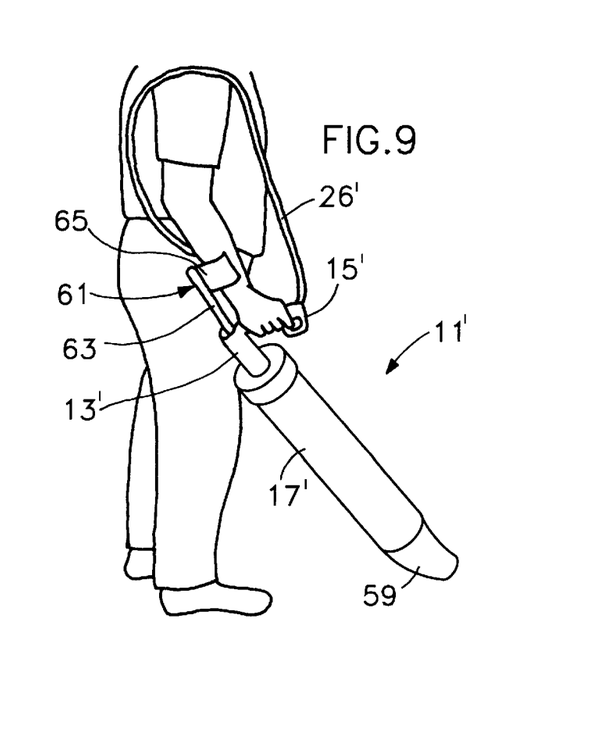
FIG. 9 is a perspective view of a modified leaf blower in accordance with the invention, which incorporates a forearm support and upstanding pistol grip that facilitate a more convenient manipulation of the blower.

In addition, as shown in FIG. 9, a modified leaf blower 11' incorporates a forearm support 61 secured to the upper end of the support tube 1 and further incorporates a handle 15' projecting upwardly from the support tube 13'. A shoulder strap 26' supports the blower's weight on the operator's shoulder. The forearm support incorporates a shaft 63 and a semicircular pocket 65 sized and configured to receive the operator's forearm. A duct extension 59 is secured to the outlet of the blower's duct 17'. In use, this modified blower is oriented at a lower angle relative to the ground and it generally requires less effort to manipulate, as compared to the blower 11 of FIG. 1.

Figure 10:
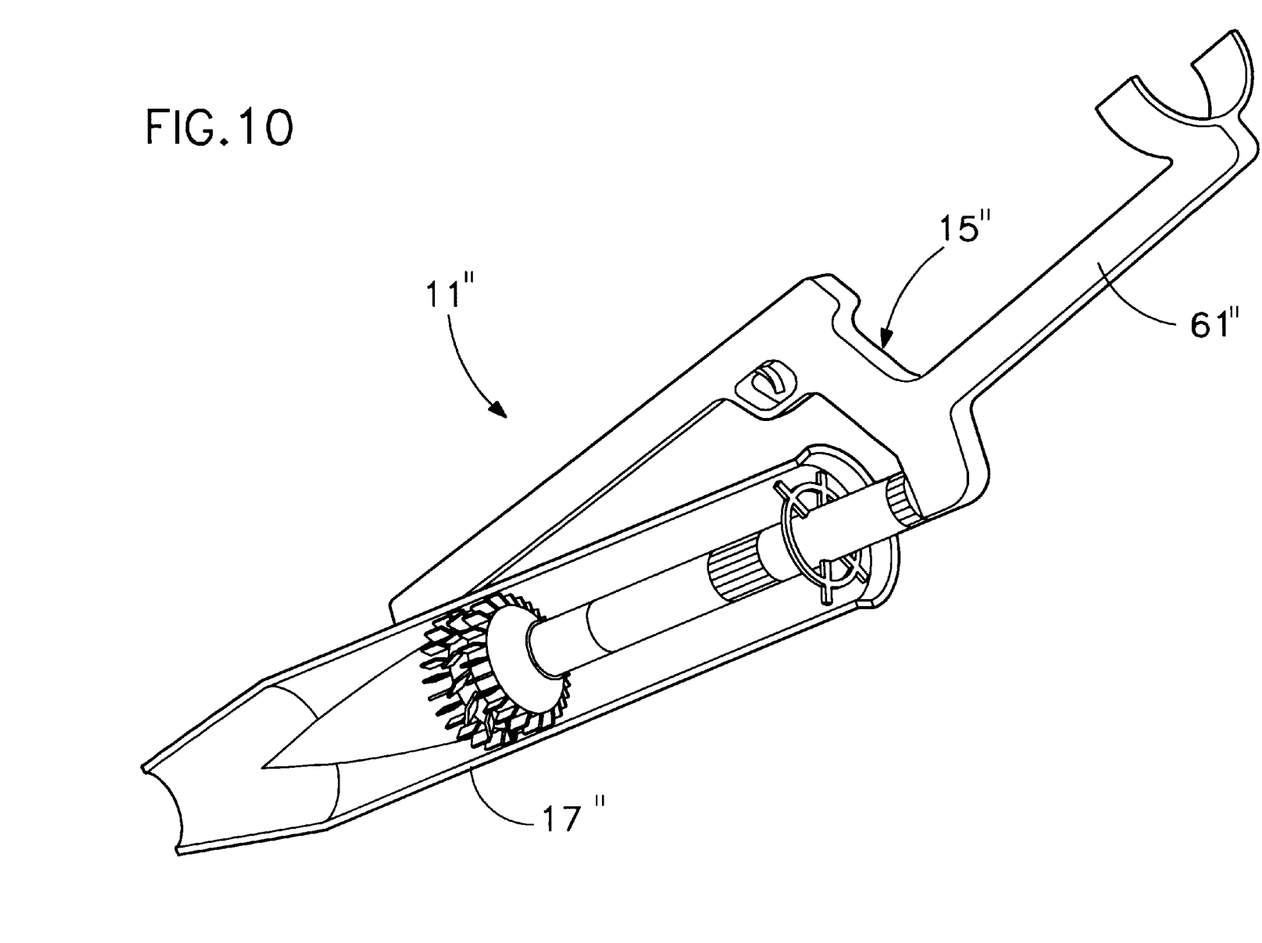
FIG. 10 is a perspective view, partially in section, of yet another leaf blower in acordance with the invention, likewise incorporating a forearm support and upstanding pistol grip.

Yet another embodiment of a leaf blower 11" in accordance with the invention is depicted in FIG. 10. It differs from the embodiments described above in that it incorporates a handle 15" and forearm support 61" that define a handle axis that is skewed upwardly relative to the axis of the duct 17". The skew angle preferably is about 20 degrees. This configuration enables the operator to hold the blower conveniently in an orientation with the duct's axis at a lower angle relative to the ground, thereby improving on the blower's leaf-blowing efficiency. This configuration also enables the operator to direct the air flow from side-to-side using a simple twist of the hand, thereby eliminating the need for a curved duct extension.

It will be appreciated that the leaf blower 11 can be modified to incorporate yet further handle configurations, as well. Handle configurations for both one-handed and two-handed operation are contemplated.

It should be appreciated from the foregoing description that the present invention provides an improved electrically powered portable leaf blower that can provide levels of air flow and velocity comparable to those of gasoline-powered blowers, yet that emits substantially reduced noise, eliminates exhaust emissions and emissions from spilled fuel, and is lightweight and convenient to operate.

Although the invention has been disclosed in detail with reference only to the preferred embodiments, those skilled in the art will appreciate that various modifications can be made without departing from the invention. Accordingly, the invention is defined only by the following claims.

We claim:

1. A blower apparatus, comprising:

a duct having an inlet and an outlet;

an electric motor located within the duct, between the inlet and the outlet, the motor including a rotatable shaft;

a fan coupled to the shaft of the motor and configured to direct air along a flow path through the duct, from the inlet to the outlet;

a handle projecting above the inlet of the duct and configured to be gripped by an operator;

a portable battery pack for supplying electrical power to the motor; and a backpack configured to be worn on the operator's back and to carry the portable batter pack.

2. The blower apparatus according to claim 1, wherein:

the motor is operable at a variable speed; and the blower apparatus further comprises a variable speed controller operatively coupled to the motor, for enabling the operator to vary the speed of the motor.

3. The blower apparatus according to claim 1, and further comprising an elongated support tube extending coaxially through at least a portion of the duct and configured to carry the motor, the fan, and the handle.

4. The blower apparatus according to claim 3, wherein:

the inlet of the duct defines an upstream end and the outlet of the duct defines a downstream end; and the support tube has a closed end, an open end upstream of the closed end, and one or more vents adjacent to the motor, such that during operation of the blower apparatus air flows through the tube, from the open end to the one or more vents, to remove heat from the motor.

5. The blower apparatus according to claim 3, wherein:

the inlet of the duct defines an upstream end and the outlet of the duct defines a downstream end; and the opposite ends of the support tube both are open.

6. The blower apparatus according to claim 3, and further comprising a cooling fan configured to direct air through the support tube.

7. The blower apparatus according to claim 1, wherein:

the duct has a substantially circular cross-section; and the blower apparatus further comprises a plurality of stator vanes mounted radially within the duct.

8. The blower apparatus according to claim 7 wherein the stator vanes are constructed of acoustic damping material.

9. The blower apparatus according to claim 7, wherein:

the plurality of stator vanes are mounted downstream of the fan;

the blower apparatus further comprises a plurality of preswirl vanes mounted radially within the duct, upstream of the fan; and the plurality of preswirl vanes and the plurality of stator vanes impart a circumferential velocity to the air being directed along the flow path through the duct that is opposite to the circumferential velocity imparted to the air by the fan.

10. The blower apparatus according to claim 9, wherein the plurality of preswirl vanes are spaced nonuniformly with respect to each other.

11. The blower apparatus according to claim 7, wherein the plurality of stator vanes are spaced nonuniformly with respect to each other.

12. The blower apparatus according to claim 1, wherein:

the duct defines an interior surface; and the blower apparatus further comprises acoustic damping material mounted on the interior surface of the duct.

13. The blower apparatus according to claim 1, wherein the motor is mounted within the duct and includes a surface exposed directly to air being directed through the duct by the fan, to remove heat from the motor.

14. The blower apparatus according to claim 13, wherein:

the blower apparatus further comprises an electronic controller mounted within the duct, adjacent to the motor, for supplying controlled amounts of electrical power to the motor; and the electronic controller includes a surface exposed directly to air being directed through the duct by the fan, to remove heat from the electronic controller.

15. The blower apparatus according to claim 14, and further comprising a heat sink attached to the motor and/or the electronic controller, wherein the heat sink is mounted within the duct and includes a surface exposed directly to air being directed through the duct by the fan, to remove heat from the heat sink.

16. The blower apparatus according to claim 1, wherein the fan comprises:

a hub; and a plurality of fan blades spaced nonuniformly around the periphery of the hub.

17. The blower apparatus according to claim 1, wherein the fan comprises a plurality of fan blades configured in a single compressor stage.

18. The blower apparatus according to claim 1, and further comprising a nozzle configured to be selectively attached to the outlet of the duct.

19. The blower apparatus according to claim 1, and further comprising one or more duct extensions configured to be selectively attached to the outlet of the duct.

20. The blower apparatus according to claim 1, and further comprising a forearm support attached to the handle.

21. The blower apparatus according to claim 20, wherein:

the duct defines a longitudinal axis; and the handle and forearm support together define a handle axis that is skewed relative to the duct axis.

22. The blower apparatus according to claim 1, wherein the apparatus includes just a single electric motor.

23. A portable leaf blower apparatus, comprising:

an elongated support tube;

a duct mounted concentrically to a lower end of the support tube, wherein the duct has an upper end that defines an inlet and a lower end that defines an outlet;

an electric motor secured to a portion of the support tube located within the duct, the motor including a rotatable shaft;

a fan assembly secured to a portion of the support tube located within the duct, wherein the fan assembly is connected to the shaft of the motor and includes a plurality of blades configured to direct air along a flow path through the duct, from the inlet to the outlet;

a portable battery pack for supplying electrical power to the motor; and a handle secured to a portion of the support tube located away from the duct and configured to be gripped by an operator, such that during operation of the blower apparatus the duct, motor, and fan are located below the operator's hand, in proximity to the ground.

24. The portable leaf blower apparatus according to claim 23, and further comprising a backpack configured to be worn on the operator's back and to carry the portable battery pack.

25. The portable leaf blower apparatus according to claim 23, wherein:

the motor is operable at a variable speed; and the portable leaf blower apparatus further comprises a variable speed controller operatively coupled to the motor, for enabling the operator to vary the speed of the motor.

26. The portable leaf blower apparatus according to claim 23, wherein:

the lower end of the support tube is closed and the upper end of the support tube is open; and one or more vents are formed in the support tube, adjacent to the motor, such that during operation of the blower apparatus air flows through the tube, from the open end to the one or more vents, to remove heat from the motor.

27. The portable leaf blower apparatus according to claim 23, wherein the opposite ends of the support tube both are open, such that during operation of the blower apparatus air is drawn through the tube, to remove heat from the motor.

28. The portable leaf blower apparatus according to claim 23, and further comprising a cooling fan configured to direct air through the support tube.

29. A blower apparatus, comprising:

a duct having an inlet and an outlet and defining a longitudinal axis;

an electric motor located within the duct, between the inlet and the outlet, the motor including a rotatable shaft;

a fan coupled to the shaft of the motor and configured to direct air along a flow path through the duct, from the inlet to the outlet;

a handle projecting above the inlet of the duct and configured to be gripped by an operator; and a trigger mounted on the handle and actuatable by the operator, for controlling the motor;

wherein the handle incorporates a hand grip and a forearm support that together define a handle axis that is skewed relative to the duct axis.

30. A blower apparatus as defined in claim 29, wherein the handle axis is skewed at an angle of about 20 degrees relative to the duct axis.

31. A blower apparatus, comprising:

a duct having an inlet and an outlet;

an electric motor located within the duct, between the inlet and the outlet, the motor including a rotatable shaft;

a fan coupled to the shaft of the motor and configured to direct air along a flow path through the duct, from the inlet to the outlet;

a handle projecting above the inlet of the duct and configured to be gripped by an operator; and an elongated support tube extending coaxially through at least a portion of the duct and configured to carry the motor, the fan, and the handle.

32. The blower apparatus according to claim 31, wherein:

the inlet of the duct defines an upstream end and the outlet of the duct defines a downstream end; and the support tube has a closed end, an open end upstream of the closed end, and one or more vents adjacent to the motor, such that during operation of the blower apparatus air flows through the tube, from the open end to the one or more vents, to remove heat from the motor.

33. The blower apparatus according to claim 31, wherein:

the inlet of the duct defines an upstream end and the outlet of the duct defines a downstream end; and the opposite ends of the support tube both are open.

34. The blower apparatus according to claim 31, and further comprising a cooling fan configured to direct air through the support tube.

35. A blower apparatus, comprising:

a duct having an inlet and an outlet;

an electric motor located within the duct, between the inlet and the outlet, the motor including a rotatable shaft;

a fan coupled to the shaft of the motor and configured to direct air along a flow path through the duct, from the inlet to the outlet;

a handle projecting above the inlet of the duct and configured to be gripped by an operator;

wherein the duct has a substantially circular cross-section, and the blower apparatus further comprises a plurality of stator vanes mounted radially within the duct;

wherein the plurality of stator vanes are mounted downstream of the fan, and the blower apparatus further comprises a plurality of preswirl vanes mounted radially within the duct, upstream of the fan; and wherein the plurality of preswirl vanes and the plurality of stator vanes impart a circumferential velocity to the air being directed along the flow path through the duct that is opposite to the circumferential velocity imparted to the air by the fan.

36. The blower apparatus according to claim 35, wherein the stator vanes are constructed of acoustic damping material.

37. The blower apparatus according to claim 35, wherein the plurality of preswirl vanes are spaced nonuniformly with respect to each other.

38. A blower apparatus, comprising:

a duct having an inlet and an outlet;

an electric motor located within the duct, between the inlet and the outlet, the motor including a rotatable shaft;

a fan coupled to the shaft of the motor and configured to direct air along a flow path through the duct, from the inlet to the outlet;

a handle projecting above the inlet of the duct and configured to be gripped by an operator;

wherein the motor is mounted within the duct and includes a surface exposed directly to air being directed through the duct by the fan, to remove heat from the motor;

wherein the blower apparatus further comprises an electronic controller mounted within the duct, adjacent to the motor, for supplying controlled amounts of electrical power to the motor; and wherein the electronic controller includes a surface exposed directly to air being directed through the duct by the fan, to remove heat from the electronic controller.

39. The blower apparatus according to claim 38, and further comprising a heat sink attached to the motor and/or the electronic controller, wherein the heat sink is mounted within the duct and includes a surface exposed directly to air being directed through the duct by the fan, to remove heat from the heat sink.

40. A blower apparatus, comprising:
a duct having an inlet and an outlet;
an electric motor located within the duct, between the inlet and the outlet, the motor including a rotatable shaft;
a fan coupled to the shaft of the motor and configured to direct air along a flow path through the duct, from the inlet to the outlet;
a handle projecting above the inlet of the duct and configured to be gripped by an operator; and
a forearm support attached to the handle.

41. The blower apparatus according to claim 40, wherein:
the duct defines a longitudinal axis; and
the handle and forearm support together define a handle axis that is skewed relative to the duct axis.

42. A blower apparatus, comprising:
a duct having an inlet and an outlet;
an electric motor located within the duct, between the inlet and the outlet, the motor including a rotatable shaft;
a fan coupled to the shaft of the motor and configured to direct air along a flow path through the duct, from the inlet to the outlet;
a handle configured to be gripped by an operator and having a grip portion not located between the inlet and the outlet of the duct and generally along a direction which forms an angle with an axis of the duct.

43. The blower apparatus according to claim 42, and further comprising a portable battery pack for supplying electrical power to the motor.

44. The blower apparatus according to claim 43, and further comprising a backpack configured to be worn on the operator's back and to carry the portable battery pack.

45. The blower apparatus according to claim 42, wherein:
the motor is operable at a variable speed; and
the blower apparatus further comprises a variable speed controller operatively coupled to the motor, for enabling the operator to vary the speed of the motor.

46. The blower apparatus according to claim 42, and further comprising an elongated support tube extending coaxially through at least a portion of the duct and configured to carry the motor, the fan, and the handle.

47. The blower apparatus according to claim 46, wherein:
the inlet of the duct defines an upstream end and the outlet of the duct defines a downstream end; and
the support tube has a closed end, an open end upstream of the closed end, and one or more vents adjacent to the motor, such that during operation of the blower apparatus air flows through the tube, from the open end to the one or more vents, to remove heat from the motor.

48. The blower apparatus according to claim 46, wherein:
the inlet of the duct defines an upstream end and the outlet of the duct defines a downstream end; and
the opposite ends of the support tube both are open.

49. The blower apparatus according to claim 46, and further comprising a cooling fan configured to direct air through the support tube.

50. The blower apparatus according to claim 42, wherein:
the duct has a substantially circular cross-section; and
the blower apparatus further comprises a plurality of stator vanes mounted radially within the duct.

51. The blower apparatus according to claim 50, wherein the stator vanes are constructed of acoustic damping material.

52. The blower apparatus according to claim 50, wherein:
the plurality of stator vanes are mounted downstream of the fan;
the blower apparatus further comprises a plurality of preswirl vanes mounted radially within the duct, upstream of the fan; and
the plurality of preswirl vanes and the plurality of stator vanes impart a circumferential velocity to the air being directed along the flow path through the duct that is opposite to the circumferential velocity imparted to the air by the fan.

53. The blower apparatus according to claim 52, wherein the plurality of preswirl vanes are spaced nonuniformly with respect to each other.

54. The blower apparatus according to claim 52, wherein:
the duct defines an interior surface; and
the blower apparatus further comprises acoustic damping material mounted on the interior surface of the duct.

55. The blower apparatus according to claim 52, wherein the motor is mounted within the duct and includes a surface exposed directly to air being directed through the duct by the fan, to remove heat from the motor.

56. The blower apparatus according to claim 55, wherein:
the blower apparatus further comprises an electronic controller mounted within the duct, adjacent to the motor, for supplying controlled amounts of electrical power to the motor; and
the electronic controller includes a surface exposed directly to air being directed through the duct by the fan, to remove heat from the electronic controller.

57. The blower apparatus according to claim 56, and further comprising a heat sink attached to the motor and/or the electronic controller, wherein the heat sink is mounted within the duct and includes a surface exposed directly to air being directed through the duct by the fan, to remove heat from the heat sink.

58. The blower apparatus according to claim 50, wherein the plurality of stator vanes are spaced nonuniformly with respect to each other.

59. The blower apparatus according to claim 42, wherein the fan comprises:
a hub; and
a plurality of fan blades spaced nonuniformly around the periphery of the hub.

60. The blower apparatus according to claim 42, wherein the fan comprises a plurality of fan blades configured in a single compressor stage.

61. The blower apparatus according to claim 42, and further comprising a nozzle configured to be selectively attached to the outlet of the duct.

62. The blower apparatus according to claim 42, and further comprising one or more duct extensions configured to be selectively attached to the outlet of the duct.

63. The blower apparatus according to claim 62, and further comprising a forearm support attached to the handle.

64. The blower apparatus according to claim 63, wherein:
the duct defines a longitudinal axis; and
the handle and forearm support together define a handle axis that is skewed relative to the duct axis.

65. The blower apparatus according to claim 42, wherein the apparatus includes just a single electric motor.

* * * * *